United States Patent [19]

Iwakawa et al.

[11] 3,976,971

[45] Aug. 24, 1976

[54] GAS-DISCHARGE DISPLAY PANEL HAVING A THIRD GROUP OF ELECTRODES FORMING CONTROL DISCHARGE SPACES

[75] Inventors: Tunekiyo Iwakawa; Akira Yano, both of Tokyo, Japan

[73] Assignee: Nippon Electric Company, Ltd., Tokyo, Japan

[22] Filed: Mar. 4, 1975

[21] Appl. No.: 555,139

[30] Foreign Application Priority Data

Mar. 5, 1974 Japan .............................. 49-25396

[52] U.S. Cl. .......................... 340/324 M; 340/336; 340/343

[51] Int. Cl.² .......................................... G06F 3/14

[58] Field of Search .............. 340/324 M, 336, 343; 315/169 TV

[56] References Cited

UNITED STATES PATENTS

| | | | |
|---|---|---|---|
| 3,493,956 | 2/1970 | Andrews et al. | 340/336 |
| 3,832,706 | 8/1974 | Reboul et al. | 340/324 M |
| 3,891,983 | 6/1975 | Lee | 340/336 |

*Primary Examiner*—Marshall M. Curtis
*Attorney, Agent, or Firm*—Hopgood, Calimafde, Kalil, Blaustein & Lieberman

[57] ABSTRACT

A gas-discharge display panel includes a third group of electrodes in addition to the first and second groups of electrodes found in a conventional gas-discharge display panel. A series of control discharge spaces are respectively formed at those positions where the third group of electrodes mate with the first group of electrodes. The voltage applied to the first group of electrodes is controlled by utilizing the constant-voltage characteristics of the cells formed between the first and third groups of electrodes.

10 Claims, 12 Drawing Figures

GAS-DISCHARGE DISPLAY PANEL HAVING A THIRD GROUP OF ELECTRODES FORMING CONTROL DISCHARGE SPACES

The present invention relates generally to gas-discharge display panels and devices.

Prior art gas-discharge display devices have been available in two types; the dc discharge type in which the electrodes are in direct contact with the discharge gas, and the ac discharge type in which the electrodes are coated with dielectric material and have no direct contact with the discharge gas. Either type operates on the principle that a voltage higher than the discharge initiating voltage (i.e., the firing voltage) is applied across the discharge space (briefly, the cell) formed between the two electrodes, thereby causing the cell to glow visibly. The voltage necessary to initiate a discharge across the cell is generally as high as 100 and several tens of volts. Even though this voltage is split between the two electrodes before application across the cell, this does not solve the problem—the voltage needed to drive the display panel is still so high that it has been extremely difficult to fabricate the display panel drive circuit into an integrated circuit.

It is an object of the invention to provide a gas-discharge display device in which the panel-electrode voltage required to initiate a glow-producing discharge is lowered to enable the display device to be operated stably and fabricated inexpensively.

Broadly considered, in the gas-discharge display panel of the invention, a third electrode is employed in addition to the conventional first and second electrodes. The voltage applied to the first electrode is controlled by utilizing the constant-voltage characteristic of the cell formed between the first and third electrodes.

The gas-discharge display panel of the present invention includes a first substrate on which a first group of electrodes are formed, and a second substrate on which second and third groups of electrodes are formed in one plane. The first and second substrates are disposed opposite to each other so that the first group of electrodes faces the second and third groups of electrodes, each of the second group of electrodes crosses at least one of the first group of electrodes, thus forming a plurality of cells, and each of the third group of electrodes mates with each of the first group of electrodes, thus also forming a plurality of cells.

The gas-discharge display device of the invention is characterized in that a voltage (i.e., a dc voltage higher than the firing voltage in the case of a dc discharge type device, or an ac voltage higher in amplitude than the unidirectional firing voltage in the case of an ac discharge type device) capable of illuminating the cells formed by the first and second groups of electrodes, as well as by the first and third groups of electrodes in the manner described above, is applied commonly to all of the first group of electrodes, and the switching element connected to each of the third group of electrodes is turned on or off so that the cell formed at each of the intersections of the first and third groups of electrodes assumes a lit or unlit state, whereby the voltage applied to the first group of electrodes is controlled. Moreover, the switching element connected to each of the second group of electrodes is turned on or off synchronously with the switching element connected to each of the third group of electrodes, whereby the discharge across the cell formed at each of the intersections of the first and second groups of electrodes is controlled for an efficient, stable display.

For ease of explanation, the display device will be assumed to be of the ac discharge type, having one electrode for each electrode group. A pulse voltage of frequency f with an amplitude $V_H$ is applied through a resistor to the first electrode. In this state, the switching circuit connected to the third electrode is kept turned on. Then a discharge occurs across the discharge cell (hereinafter referred to as the control cell) formed between the first and third electrodes when the voltage applied to the first electrode is higher than the unidirectional firing voltage Vufc of the control cell. Thus, as a result of the current flowing in the control cell, the waveform of the pulse voltage is distorted and a voltage drop is produced across the cell to cause the voltage at the first electrode to be automatically maintained at the unidirectional discharge-sustaining voltage of the control cell. When the switching circuit connected to the third electrode is in the off state, the voltage at the first electrode is the sum of the unidirectional discharge-sustaining voltage Vusc and the voltage V induced at the third electrode, i.e., Vusc + V. In other words, the voltage applied to the first electrode is irrelevant to the voltage $V_H$ which is applied to the first electrode through a resistor but assumes the value Vusc or Vusc+V according to the on or off state of the switching element connected to the third electrode.

When the switching element connected to the third electrode is in the off state, a voltage V is induced at the second electrode through the discharge cell (hereinafter referred to as the display cell) formed between the first and second electrodes. When the switching element is in the on state, no voltage is induced at the second electrode.

In this display device, the following conditions are to be established.

$$\mathrm{Vufd} > \mathrm{Vufc} \quad (1)$$

$$\mathrm{Vusd} > \mathrm{Vusc} \quad (2)$$

where Vufd and Vusd are the unidirectional firing voltage and the unidirectional discharge-sustaining voltage, respectively, of the display cell.

The following table shows how the states of the two discharge cells which meet the conditions (1) and (2) vary according to the states of the switching elements connected to the second and third electrodes.

| | | | | | |
|---|---|---|---|---|---|
| Switching state | 3rd electrode switch | on | on | off | off |
| | 2nd electrode switch | on | off | on | off |
| Electrode voltage | 1st electrode | Vusc | Vusc | Vusc+V | Vusc+V |
| | 2nd electrode | O | V | O | V |
| Voltage applied across display cell between 1st and 2nd electrodes | | Vusc | Vusc−V | Vusc+V | Vusc |

-continued

| | | | | |
|---|---|---|---|---|
| Discharge state of display cell between 1st and 2nd electrodes | unlit | unlit | lit | unlit |

Note: The value of V is determined to satisfy the condition: Vufd< Vusc + V (3)

With the conditions (1), (2) and (3) satisfied, the display cell glows only when the switching element of the third electrode is off and the switching element of the second electrode is on.

The conditions (1) and (2) can be realized simply by making the area of the control cell larger than that of the display cell. The condition (3) may arbitrarily be determined dependent only upon the rated voltage of the switching elements connected to the second and third electrodes.

It is apparent that this operating principle applies equally to the display device having a plurality of electrodes for the individual electrode group. In such application, it should be considered that the unidirectional firing voltage and the unidirectional discharge-sustaining voltage differ by the discharge cells.

Because, as indicated in the table, the voltage applied to the discharge cell depends upon the unidirectional discharge sustaining voltage Vusc of the control cell and upon the induced voltage V which is limited only by the rated voltage of the switching elements, the voltage applied to the discharge cell is very stable against variations in the external voltage, i.e., the voltage applied to the first electrode through a resistor. In addition, an excess voltage, Vusc + V − Vufd, is applied across the display cell. Because this voltage is nearly proportional to the brightness of the display glow, brightness modulation may be made on the display by controlling the voltage V induced at the second electrode.

The control cell is lit whenever the display cell is unlit. This eliminates any discharge lag of the type that was found in prior art gas-discharge display tubes.

Furthermore, the drive circuit of the display device of the invention does not require a high-frequency pulse voltage for all the groups of electrodes as in the prior art circuitry, but only for the first group of electrodes which serve as sources of power supply. In addition, a dc-like or low-frequency voltage suffices for the control electrodes, i.e., the second and third groups of electrodes. Thus, the need for the provision of AND gates for the drive circuit is eliminated, the construction of the circuit is simplified, and power consumption by the circuit is reduced.

Furthermore, when the display device of the invention is utilized for an X-Y dot matrix display on the side of scan electrodes, circuits functioning as AND gates are constituted through the control cells formed between the first and third groups of electrodes in the gas-discharge display panel. As a result, the number of drive circuits used is markedly reduced.

The features and advantages of the invention will become more apparent from the following detailed description when read in conjunction with the accompanying drawings in which:

FIG. 1*a* is a perspective view of the first substrate of a gas-discharge display panel according to one embodiment of the invention; FIG. 1*a'* is a cross-sectional view taken across the line A—A' of FIG. 1*a;*

FIG. 1*b* is a perspective view of the second substrate of the device;

FIG. 1*b'* is a cross-sectional view taken across the line B—B' of FIG. 1*b;*

Figure 1B:
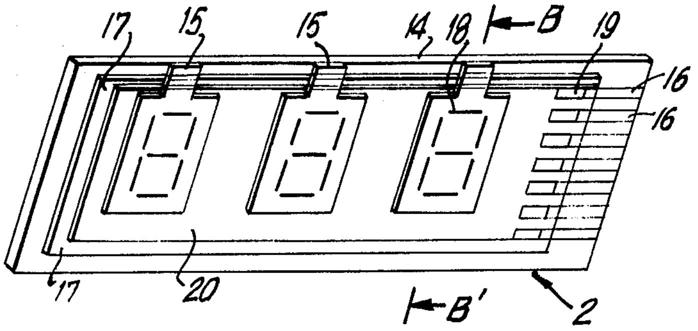
Figure 1A:
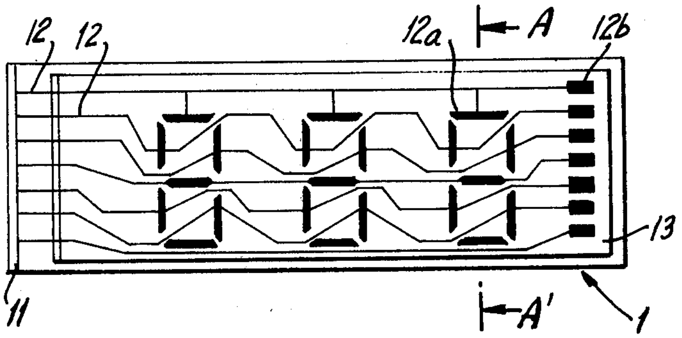
Figure 1B:
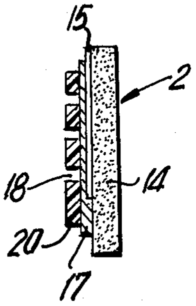
Figure 1A:
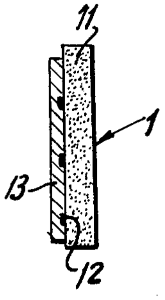

Referring to the figures illustrating an embodiment of a numerical display device of the invention, FIG. 1*a* shows the construction of a first substrate 1 constituted essentially of a glass substrate 11 on which a first group of electrodes 12 are formed, with a coating of a dielectric film 13 thereon. FIG. 1*b* shows the construction of a second substrate 2 constituted in such a manner that a second group of electrodes 15 and a third group of electrodes 16 are formed on a glass substrate 14. The electrode areas, except for the portions for leads from the electrodes 15 and 16, are coated with a dielectric film 17, and another dielectric film 20 is formed on the dielectric film 17 except in the spaces 18 where display cells are formed and the spaces 19 where control cells are formed. The first and second substrates are disposed opposite to each other so that the portions 12*a* where the display cells of the first group of electrodes are formed mate with the spaces 18 where the display cells of the second substrate 2 are formed, and that the portions 12*b* where the control cells of the first group of electrodes are formed mate with the spaces 19 where the control cells of the second substrate 2 are formed.

The outer edges of the two substrates 1 and 2 are hermetically sealed, such as with frit glass, and a discharge gas such as neon is introduced into the spaces 18 where the display cells are formed and into the spaces 19 where the control cells are formed, thereby to realize a numerical display panel. The display cell of this display panel is the same in construction as the so-called plasma display panel, except for the use of a group of control cells formed in the spaces 19 where the first group of electrodes 12 mate respectively with the third group of electrodes 16.

Figure 2:
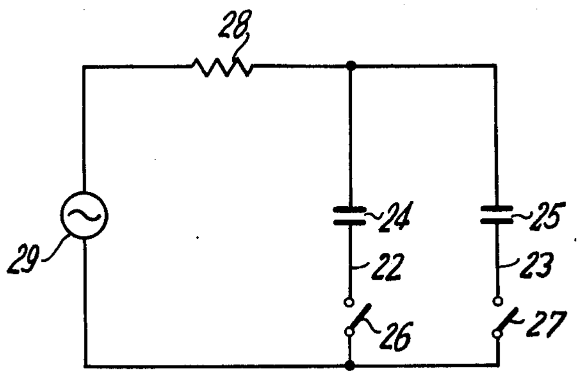
FIG. 2 is an equivalent circuit illustrating the principles of the invention.

The relationship between the display cell and the control cell is described with reference to FIG. 2, in which the display cell and control cell formed by one of the first group of electrodes and each of the second and third groups of electrodes are expressed in terms of an equivalent circuit. In FIG. 2, an electrode 21 represents one of the first group of electrodes, an electrode 22 represents one of the second group of electrodes, an electrode 23 represents one of the third group of electrodes, and capacitors 24 and 25 represent the display cell and the control cell, respectively. Switches 26 and 27 represent switching circuits connected to the second and third groups of electrodes, respectively. A stabilizing resistor 28 is connected between each of the first group of electrodes and a high-frequency power source 29.

When the switches 26 and 27 are closed and when the power source 29 supplies a voltage higher than the unidirectional firing voltage of the display cell 24 and control cell 25, a glow takes place across the discharge cell 24 or 25, whichever is of a lower unidirectional firing voltage. As a result, a current flows through the resistor 28, the high-frequency voltage at the electrode 21 drops, the waveform thereof collapses, the effective voltage on the cell above the electrode 21 falls to the unidirectional discharge sustaining voltage of the ignited one of the cells, and thus the cell whose unidirectional firing voltage is higher is not ignited. Then, when the switch connected to the cell which has been lit is turned off while the switch connected to the unlit cell is kept turned on, the cell being lit becomes unlit and the other cell becomes lit. Therefore, the state of the display cell is controlled indirectly by the use of a common power source according to the lit or unlit state of the control cell. To this effect, the following conditions must be met for the display cell and the control cell.

$$Vufc < Vufd \quad (5)$$

$$Vusc < Vufd \quad (6)$$

where

Vufc is the unidirectional firing voltage of control cell;

Vufd is the unidirectional firing voltage of the display cell; and

Vusc is the unidirectional discharge-sustaining voltage of the control cell.

As far as the display cell of FIG. 2 satisfies the conditions (5) and (6), the control cell 25 is ignited and the display cell 24 is not ignited when the high-frequency voltage is turned on, with the switches 26 and 27 turned on. Then, by turning off the switch 27, which is connected to the control cell, the display cell is ignited. In this state, i.e., where the switch 26 is on and the switch 27 is off, when the switch 27 is turned on, the control cell 24 becomes lit and the display cell 25 becomes unlit, as far as these cells satisfy the following condition.

$$Vufc < Vusd \quad (7)$$

where

Vusd is the unidirectional discharge-sustaining voltage of the display cell

Generally, the unidirectional firing voltage is higher than the unidirectional discharge-sustaining voltage, and hence the conditions (5), (6) and (7) are commonly represented by the condition (7).

The condition (7) may readily be established by making the area of each control cell larger than that of each display cell and thus utilizing the change in the electric field produced in the discharge space 18 due to the dielectric film 20 of FIG. 1, and/or by changing the gap of the discharge space of the display cell, as well as the gap of the discharge space of the control cell.

Figure 3:
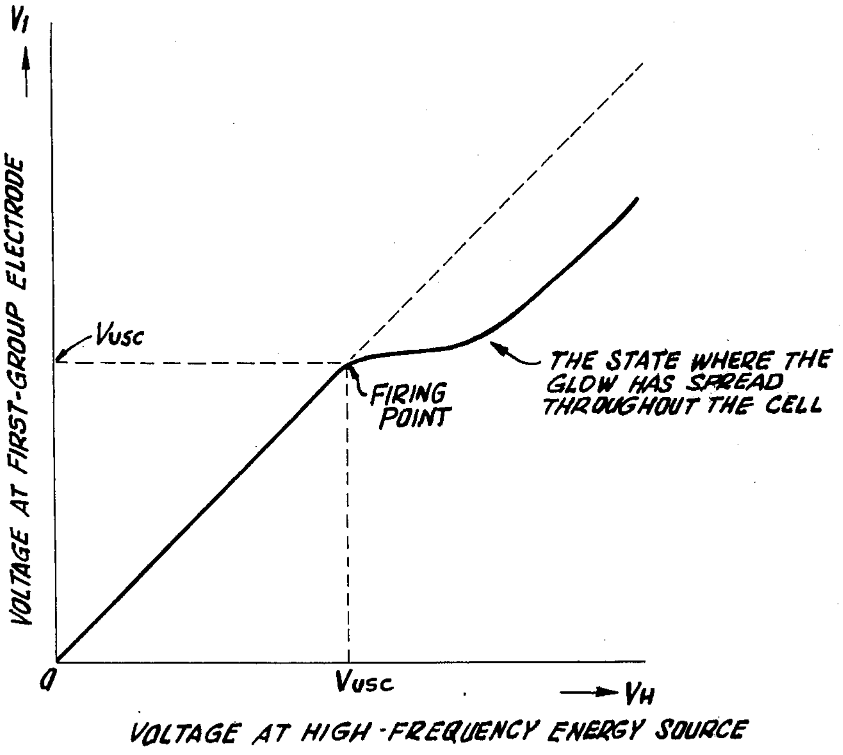
FIG. 3 is a characteristic diagram illustrating the principles of the invention.

FIG. 3 shows the relationship between the voltage $V_H$ of the high-frequency power source 29 and the voltage $V_1$ of the first electrode 21.

In the state where the switch 27 connected to the control cell is kept on, when the voltage of the power source 29 is gradually increased, the discharge state of the control cell will change. When the power source voltage is low, a discharge takes place in the area in the control cell where the firing voltage is minimum. As the power source voltage increases, the discharge propagates in the entire space in the cell. During this step, the voltage $V_1$ of the electrode 21 is kept nearly constant owing to the constant voltage characteristic of the discharge. However, if discharge spreads over the entire control cell, this will cause the voltage $V_1$ to rapidly rise and exceed the unidirectional discharge-sustaining voltage of the display cell 24. To prevent this state from occurring, it is necessary to keep the discharge from spreading over the entire cell by suitably determining the voltage of the high-frequency power source and the value of the resistor 28.

In FIG. 2, the characteristic of the display cell 24 is similar to that of the control cell 25, and the voltage of the high-frequency power source 29 and the value of the resistor 28 are determined so that a discharge does not spread over the entire control cell when the switch 27 of the control cell 25 is in the on state. Hence, even if the switch 27 of the control cell is turned off and the switch 26 of the display cell is turned on, the discharge in the display cell does not spread over the whole space but is limited to part of the space, as long as the area of the control cell is equal to that of the display cell. This indicates the need for the area of the display cell to be smaller than that of the control cell in order to spread a discharge over the entire display cell, thus realizing a visually desirable display.

The principle of the above phonomena may be utilized for applications to a plurality of control cells and display cells. In such applications, the condition (7) should be based on the lowest one of the unidirectional firing voltages of a plurality of display cells in parallel to the individual control cells.

Display operations using switches connected to the display cell and control cell have been described. In a practical gas-discharge display device, switching circuits are used instead of the switches. The cost of the switching circuit largely varies according to the rated voltage required for the switching element used; generally, the greater the rated voltage required, the higher is the cost of the switching circuit.

Figure 4:
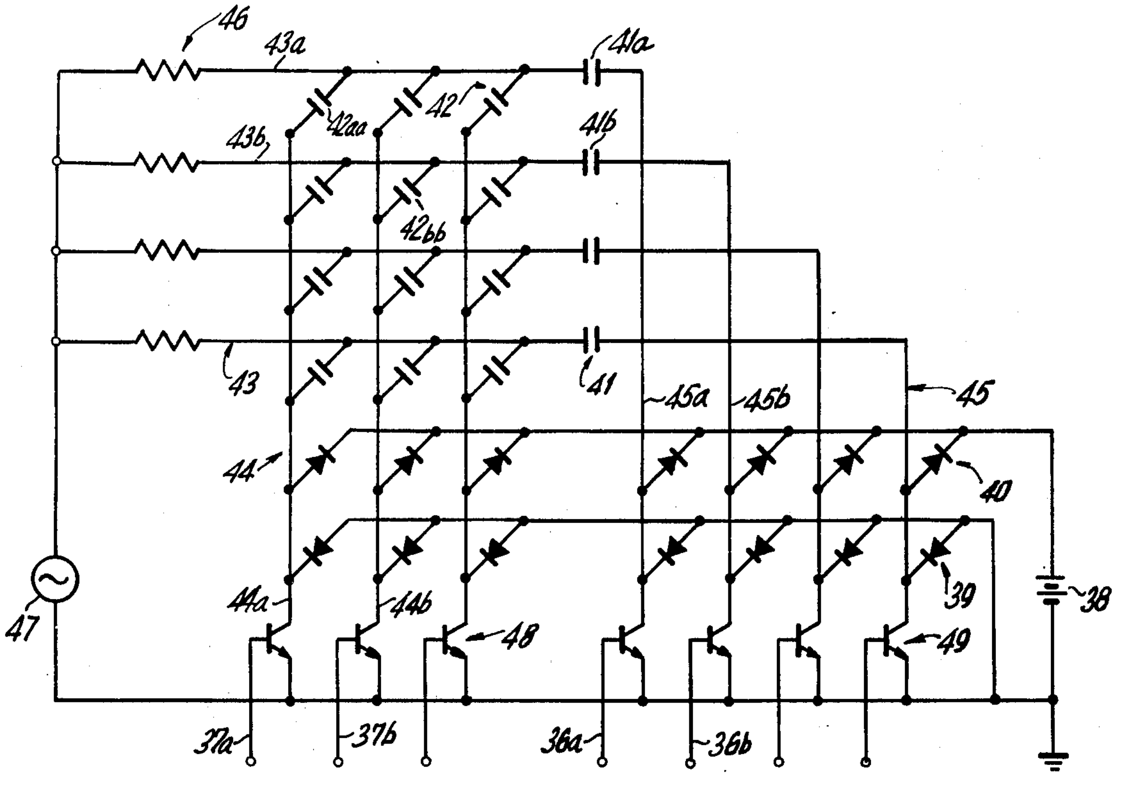
FIG. 4 is a circuit diagram illustrating the construction of a gas-discharge display device embodying the invention.
Figure 5:
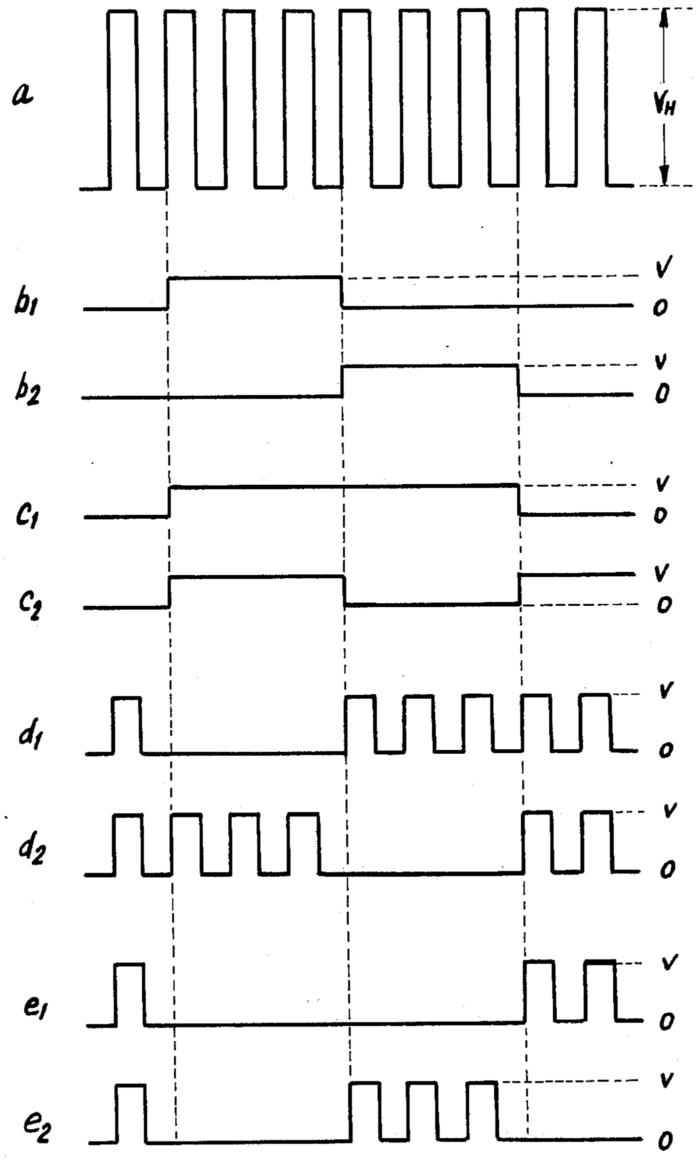
FIGS. 5 and 6 are diagrams of voltage waveforms for illustrating the operation of the device shown in FIG. 4.
Figure 6:
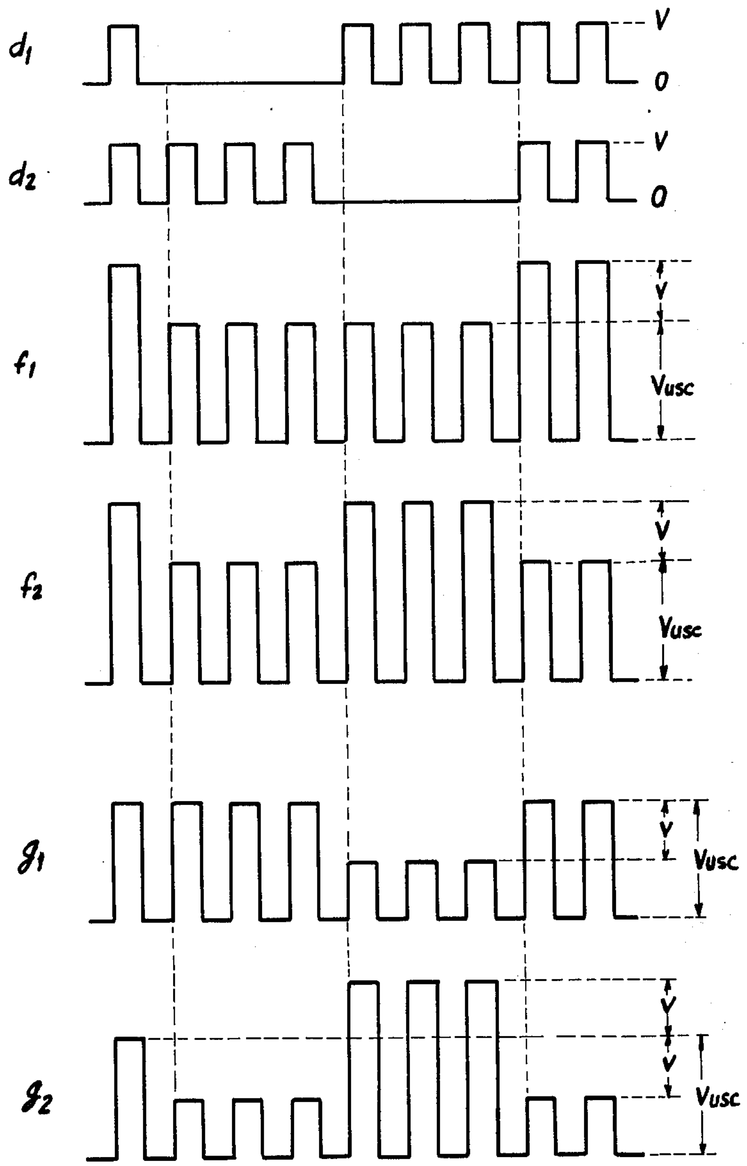

FIG. 4 shows an example of such a switching circuit, and FIGS. 5 and 6 are timing diagrams of input and output voltages appearing in the circuit of FIG. 4. This switching circuit is described hereinbelow.

In FIG. 4, a capacitor 41 represents a group of control cells and a capacitor 42 represents a group of display cells. An electrode 43 represents a first group of electrodes, an electrode 44 represents a second group of electrodes, and an electrode 45 represents a third group of electrodes. Further, a resistor 46 represents a stabilizing resistor connected between a high-frequency power source 47 and the first group of electrodes. A transistor 48 functions as a switching element connected to the second group of electrodes 44, and a transistor 49 functions as a switching element connected to the third group of electrodes 45. Diodes 39 and 40 protect the transistors 48 and 49 in such a manner that the high-frequency voltages induced by the high-frequency power source 47 at the second and third groups of electrodes 44 and 45 through the group of display cells 42 and the group of control cells 41, are each clamped to a given voltage V when the transistors 48 and 49 are in the off state. A dc source 38 is used for the clamping purpose.

The display cell 42 and the control cell 41 meet the condition (7), and the voltage of the high-frequency power source 47 and the valve of the resistor 46 are determined so as not to allow a discharge to spread over the entire control cell. The voltage $V_H$ of the power source 47 assumes a continuous square waveform as shown in FIG. 5*a*. When refresh signals $b_1$ and $b_2$ are applied to the bases 37*a* and 37*b* of transistors 48, respectively, the transistors turn on or off according to the refresh signals. Since the transistor in the on state has a very low impedance, no high-frequency voltage is induced at the collector of the transistor through the cell. When, however, the transistor is in the off state, a high-frequency voltage with an amplitude V of the clamp voltage is induced at the collector. As a result, voltage waveforms $d_1$ and $d_2$ respectively appear at electrodes 44*a* and 44*b* of the second group of electrodes. Similarly, when data signals $c_1$ and $c_2$ are applied to the bases 36*a* and 36*b* of transistors 49, voltage waveforms $e_1$ and $e_2$ respectively appear at electrodes 45*a* and 45*b* of the third group of electrodes.

The voltages at electrodes 43*a* and 43*b* of the first group of electrodes which mate with electrodes 45*a* and 45*b*, respectively, of the third group of electrodes are of waveforms $f_1$ and $f_2$ of FIG. 6, respectively representing the sums of the unidirectional discharge-sustaining voltages Vusc of the control cells 41*a* and 41*b*, and the voltages V induced at the electrodes 45*a* and 45*b*. Consequently, a voltage Vusc of waveform $g_1$ of FIG. 6, i.e., the voltage difference between voltages $d_1$ and $f_1$ of FIG. 6, is applied across the display cell 42*aa* formed between the electrode 43*a* of the first group of electrodes and the electrode 44*a* of the second group of electrodes, with the result that this cell is not ignited. A voltage of waveform $g_2$ of FIG. 6 applied across the display cell 42bb formed between the electrodes 44*b* and 43*b*, causes this cell to be ignited on the condition that Vusc + V > Vufd.

In the display device of the invention, as described above, a voltage is applied from the high-frequency power source to the first group of electrodes through a suitable resistor, and a refresh signal is supplied to sequentially turn on the switching elements connected to the individual second group of electrodes. A signal synchronous with the refresh signal is supplied so that each of the switching elements connected to the individual third group of electrodes turns off when such switching element is selected, and the voltage V induced at the individual second and third groups of electrodes meets the condition V+ Vusc>Vufd. By this operation, the selected display cell is ignited to glow, whereby the desired display is obtained.

Figure 7:
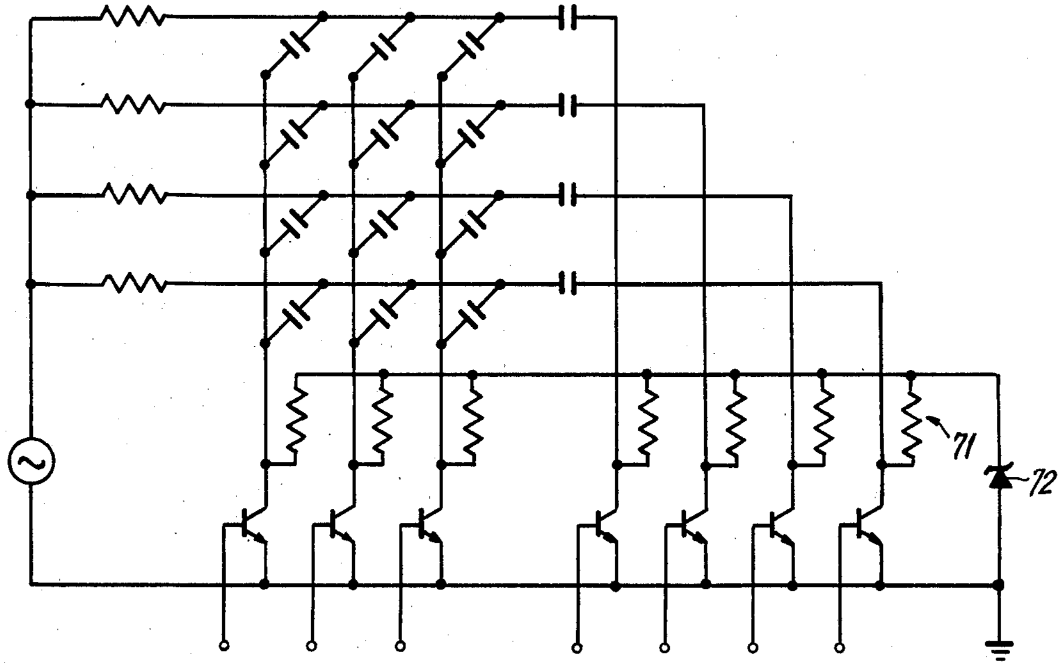
FIG. 7 is a circuit diagram showing the construction of a gas-discharge display device according to another embodiment of the invention.

FIG. 7 shows another circuit of the invention wherein a resistor 71 is used instead of the clamp diode of the circuit of FIG. 4 and a zener diode 72 is used instead of the dc source of the circuit of FIG. 4. The operation of this circuit is the same as described for the circuit illustrated in FIG. 4.

Examples of the embodiment of the invention are described below.

EXAMPLE 1

The drive circuit shown in FIG. 4 was used to drive a 12-digit numerical display panel with a display cell area of 15 mm² and a control cell area of 75 mm², by the use of a high-frequency power source 47 at 240 V, 110 kHz, and a dc source 38 at 40 V. The display panel operated stably.

EXAMPLE 2

The display panel of Example 1 was driven by the circuit of FIG. 7 with a resistor 71 having a value of 20 kΩ and at a zener voltage of the zener diode 72 of 30 V. The display panel operated stably.

EXAMPLE 3

The display panel of Example 1 was driven by the circuit of FIG. 7 in which a dc source was used in place of zener diode, and a signal toggled by a high frequency in phase with the high-frequency power source voltage was applied to the base terminal of each switching element. The panel operated stably even at a dc source voltage as low as 20 V.

EXAMPLE 4

Figure 8:
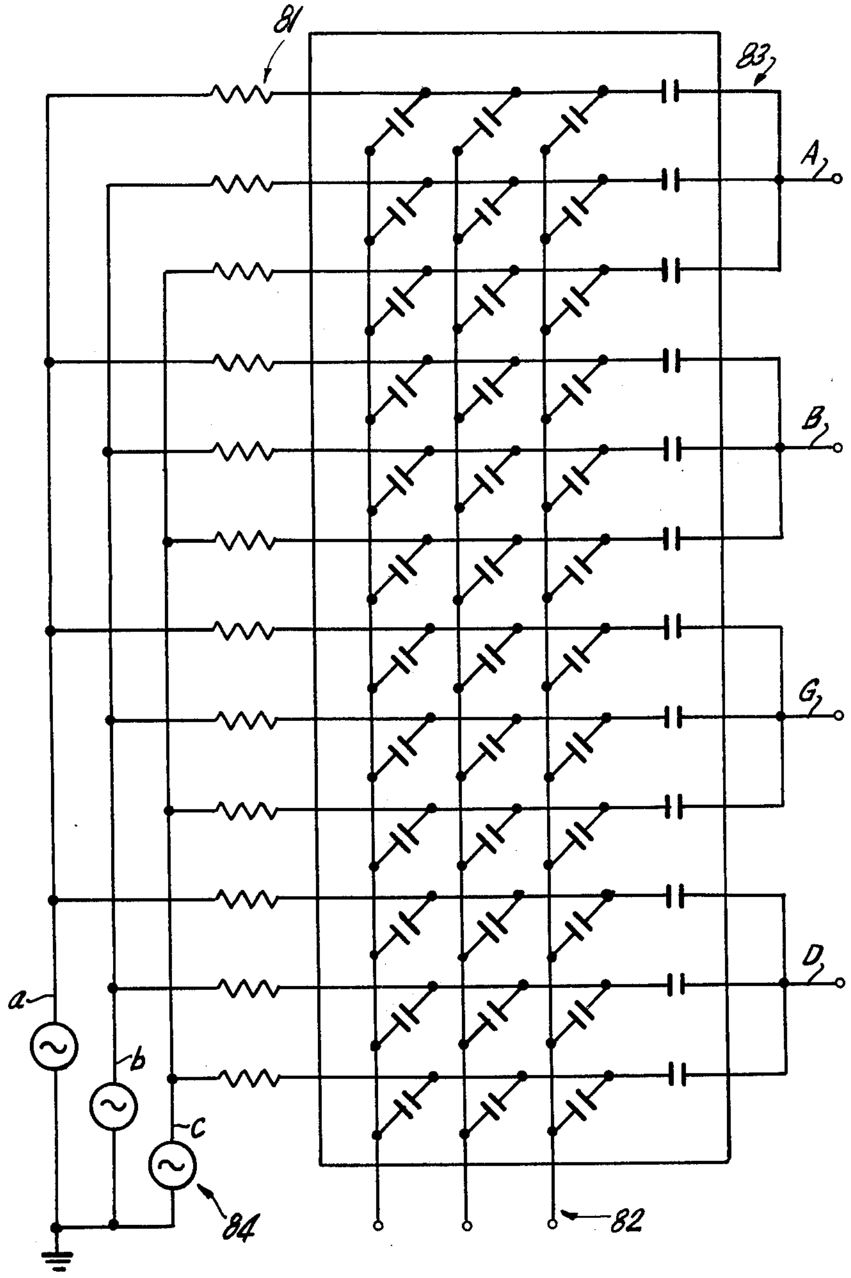
FIG. 8 is a circuit diagram showing the construction of another gas-discharge display device formed according to the invention.

The display panel of the invention was utilized for an X-Y dot matrix display panel on the side of scan in the manner shown in FIG. 8. In FIG. 8, the area encircled with the dot-dash line indicates the display panel. Electrode groups 81, 82 and 83 respectively correspond to the first, second and third electrode groups in FIG. 4 and operate in the same manner as in FIG. 4.

This example is characterized in that a plurality of high-frequency power sources 84 are connected to the first group of electrodes 81 through resistors, and the third group of electrodes 83 are divided into a plurality of sets. The matrix is scanned in the following manner The high-frequency power sources 84 are refreshed in the order of *a-b-c*, and a set of electrodes A, B, C and D of the electrode group 83 are turned off in the order of A-B-C-D each time the high-frequency power sources 84 are refreshed in the order of *a-b-c*. Thus, the voltages applied to the column electrodes scan the matrix for display according to the principle described previously. The display panel of the invention, when applied to the side of scan electrodes of an X-Y dot matrix display panel, enables AND gates to be formed within the panel, thereby greatly reducing the number of drive elements required. It is apparent that the panel shown in FIG. 8 can be efficiently used as a scanner such as a static printing scanner.

When the time width of the input pulse to the switching element connected to the electrode 82 (FIG. 8) is changed, the brightness of the display cell is changed for the same reason as in the plasma display, whereby a gray scale display can be obtained.

The display cells and control cells may be fabricated separately and the two types of cells may then be assembled in exterior. Furthermore, when the unidirectional discharge sustaining voltage of the display cell is lower than the unidirectional firing voltage of the control cell, an external drive circuit may be used, whereby the former voltage is made apparently higher than the latter. Furthermore, according to the invention, a display device in which the area of the display cell is larger than that of the control cell can be driven by the use of an external circuit operated under adequate conditions.

Thus, whereas the display device of the invention has been hereinabove described with respect to several embodiments, it will be understood that modifications may be made therein without necessarily departing from the spirit and scope of the invention.

What is claimed is:

1. A gas-discharge display panel comprising a first substrate having a first group of electrodes formed on one surface, a second substrate having second and third groups of electrodes formed on one surface, said one surface of said first substrate being opposite to said one surface at said second substrate across a gap, thereby to define a plurality of display discharge spaces at positions where said second group of electrodes intersect at least one of said first group of electrodes and a plurality of control discharge spaces at positions where said third group of electrodes mate respectively with said first group of electrodes, said display and said control discharge spaces being adapted to have a discharge gas introduced therein, whereby voltage applied to said first group of electrodes is controlled by utilizing the constant-voltage characteristics of said control discharge spaces.

2. The gas-discharge display panel of claim 1, further comprising a group of resistors each having one end respectively connected to each of said first group of electrodes, a power source connected to the other end of each of said resistors, a first group of switching elements respectively connected to one end of each of said third group of electrodes, and a second group of switching elements respectively connected to one end of each of said second group of electrodes, said first group of switching elements being switched to control the voltages at said first group of electrodes through said control discharge spaces, and said second group of switching elements being switched synchronously with said first group of switching elements to selectively cause said display discharge spaces to glow for display.

3. The gas-discharge display panel of claim 1, in which the surface of at least one of said first, second and third groups of electrodes is coated with a dielectric material.

4. The gas-discharge display panel of claim 1, wherein the area of the discharge cell formed at the intersection of each of said first group of electrodes and each of said second group of electrodes is equal to or smaller than that of the discharge cell formed at the intersection of each of said first group of electrodes and the mating one of said third group of electrodes.

5. The gas-discharge display panel of claim 1, wherein a view-side surface of the display panel is coated with non-transparent material in the areas corresponding to the intersections of said first group of electrodes and said third group of electrodes.

6. A gas-discharge display device using the gas-discharge display panel as set forth in claim 3, wherein said first group of electrodes are connected in common to a high-frequency power source through resistors, and comprising a first plurality of variable impedance elements connected respectively to said third group of electrodes each corresponding to each of said first group of electrodes, and a second plurality of variable impedance elements respectively connected to said second group of electrodes, the discharge state of the discharge space formed between each of said first group of electrodes and each of said third group of electrodes being controlled by changing the impedance of each of said variable impedance elements, the high-frequency voltage applied to each of said first group of electrodes being controlled through the discharge state thereof, and the impedance of each of said variable impedance elements connected to said second group of electrodes being changed synchronously with the changing of the impedance of said variable impedance elements connected to said third group of electrodes, whereby the cells formed between said first group of electrodes and said second group of electrodes are selectively ignited to glow for display.

7. The gas-discharge display device of claim 6, wherein each of said first group of electrodes and each of said third group of electrodes are clamped to a dc source through one of a diode and a resistor.

8. The gas-discharge display device of claim 6, wherein the ratio of the high impedance state of the low impedance state of said variable impedance elements connected to each of said second or third group of electrodes is controlled, whereby the number of discharges in each of the discharge spaces formed between said first group of electrodes and said second group of electrodes is controlled and the brightness of discharge glow is thus modulated.

9. A gas-discharge display device using the gas-discharge display panel set forth in claim 3, wherein said first group of electrodes are connected in common to a high-frequency power source through resistors, and a high-frequency voltage having the same phase as or the opposite phase from that of said high-frequency power source is selectively applied to each of said second group of electrodes and to each of said third group of electrodes, whereby the cells at the intersections of said first and second electrodes are selectively ignited to glow for display.

10. A gas-discharge display device using the gas-discharge display panel set forth in claim 3, wherein said first group of electrodes are divided into a plurality of sets each consisting of a plurality of electrodes, each set of said electrodes being connected in common to a power source circuit through resistors, said third group of electrodes being divided into a plurality of sets each comprising a plurality of electrodes, and further including a plurality of power source circuits connected to the individual sets of said first group of electrodes, and means for sequentially operating said power source circuits and for applying an electric signal in sequence to the individual sets of said third group of electrodes, whereby the individual electrodes of said first group of electrodes are sequentially selected through discharges across the discharge spaces formed between said first group of electrodes and said third group of electrodes, and means for applying electric signal to the individual second group of electrodes synchronously with the sequential selection of the individual electrodes of said first group of electrodes, thereby selectively igniting to glow for display a plurality of discharge spaces formed between said first group of electrodes and said second group of electrodes.

* * * * *

UNITED STATES PATENT OFFICE

CERTIFICATE OF CORRECTION

Patent No. 3,976,971 Dated August 24, 1976

Inventor(s) T. Iwakawa et al.

It is certified that error appears in the above-identified patent and that said Letters Patent are hereby corrected as shown below:

In the caption, change Assignee: "Nippon Electric Company, Ltd.," to -- Nippon Electric Company, Limited --.

Signed and Sealed this

Tenth Day of May 1977

[SEAL]

*Attest:*

RUTH C. MASON
*Attesting Officer*

C. MARSHALL DANN
*Commissioner of Patents and Trademarks*